United States Patent
Bustamante

(10) Patent No.: US 9,423,901 B2
(45) Date of Patent: Aug. 23, 2016

(54) SYSTEM AND METHOD TO CONTROL SCREEN CAPTURE

(71) Applicant: Intel Corporation, Santa Clara, CA (US)

(72) Inventor: Jose Angel Bustamante, La Calera (AR)

(73) Assignee: Intel Corporation, Santa Clara, CA (US)

( * ) Notice: Subject to any disclaimer, the term of this patent is extended or adjusted under 35 U.S.C. 154(b) by 17 days.

(21) Appl. No.: 14/225,982

(22) Filed: Mar. 26, 2014

(65) Prior Publication Data

US 2015/0277638 A1    Oct. 1, 2015

(51) Int. Cl.
| | |
|---|---|
| *G06F 3/041* | (2006.01) |
| *G06T 5/00* | (2006.01) |
| *G06F 3/0488* | (2013.01) |
| *G06F 3/0484* | (2013.01) |

(52) U.S. Cl.
CPC .......... *G06F 3/0412* (2013.01); *G06F 3/0488* (2013.01); *G06F 3/04845* (2013.01); *G06T 5/002* (2013.01)

(58) Field of Classification Search
CPC .. H04N 5/23212; G06T 5/002; G06F 3/0488
See application file for complete search history.

(56) References Cited

U.S. PATENT DOCUMENTS

| | | | | |
|---|---|---|---|---|
| 2011/0267530 A1* | 11/2011 | Chun | ................. | G06F 3/04883 348/333.11 |
| 2012/0056830 A1* | 3/2012 | Suzuki | ................. | G06F 1/1626 345/173 |
| 2013/0069915 A1* | 3/2013 | Kukulj | ................. | G06F 3/0236 345/175 |
| 2013/0088614 A1* | 4/2013 | Lee | ........................ | G06T 5/002 348/223.1 |
| 2014/0078172 A1 | 3/2014 | Systrom et al. | | |
| 2014/0111638 A1* | 4/2014 | Isakov | ............... | H04N 5/23222 348/135 |

FOREIGN PATENT DOCUMENTS

| | | |
|---|---|---|
| JP | 2004062560 A | 2/2004 |
| JP | 2012098888 A | 5/2012 |
| KR | 1020130138973 A | 12/2013 |
| KR | 1020140035753 A | 3/2014 |
| WO | WO-2015148085 A1 | 10/2015 |

OTHER PUBLICATIONS

Hauk, Chris, "Review: iDelete for iOS—This Text Message Will Self-Destruct in 10 Seconds", MacTrast, [online]. Retrieved from the Internet: <URL: http://www.mactrast.com/2013/03/review-idelete-for-ios-this-text-message-will-self-destruct-in-10-seconds/>, (Mar. 23, 2013), 6 pgs.
International Application Serial No. PCT/US2015/018957, International Search Report mailed Jun. 17, 2015, 3 pgs.
International Application Serial No. PCT/US2015/018957, Written Opinion mailed Jun. 17, 2015, 8 pgs.

* cited by examiner

*Primary Examiner* — Gerald Johnson
(74) *Attorney, Agent, or Firm* — Schwegman Lundberg & Woessner, P.A.

(57) ABSTRACT

Various systems and methods for controlling screen captures are described herein. A system comprises a touchscreen; a display module communicatively coupled to the touchscreen, the display module to display on the touchscreen an image in a blurred state to a user; a touchscreen module communicatively coupled to the touchscreen, the touchscreen module to detect a contact point on the touchscreen resulting from the user touching the touchscreen; wherein the display module is to display the image in a focused state on the touchscreen in response to the touchscreen module detecting the contact point; wherein the touchscreen module is to detect a change in the contact point; and wherein the display module is to display the image in the blurred state in response to the touchscreen module detecting the change in the contact point.

22 Claims, 4 Drawing Sheets

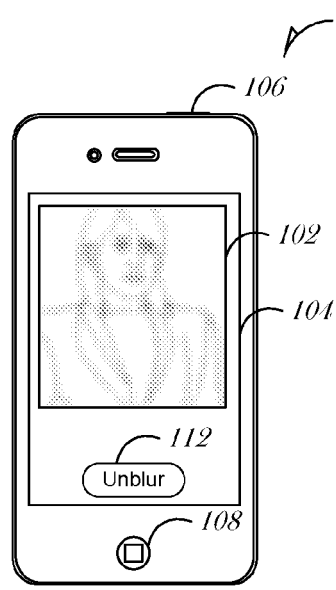
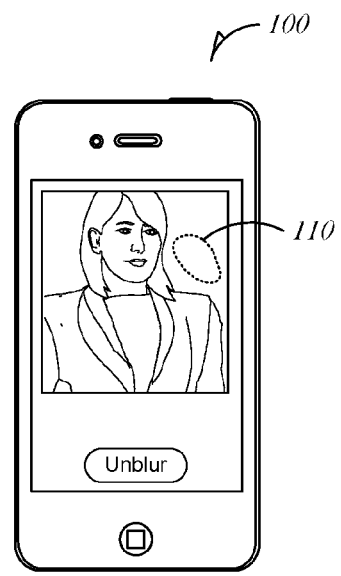
FIG. 1A  FIG. 1B
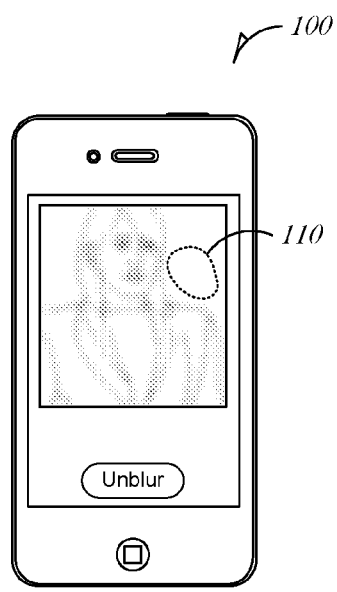
FIG. 1C

SYSTEM AND METHOD TO CONTROL SCREEN CAPTURE

TECHNICAL FIELD

Embodiments described herein generally relate to mobile devices and in particular, to systems and methods to control screen captures.

BACKGROUND

Various social networking applications provide users the ability to share images and video. Social networking applications may provide various privacy settings for shared content. Users may designate whether various groups, such as friends, family, or the public are able to view shared content. However, once a person is able to view the content, the person may save, print, or broadcast the content to other users.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIGS. 1A-1C are schematic drawings illustrating a system to control screen captures, according to an embodiment;

DETAILED DESCRIPTION

Figure 2:
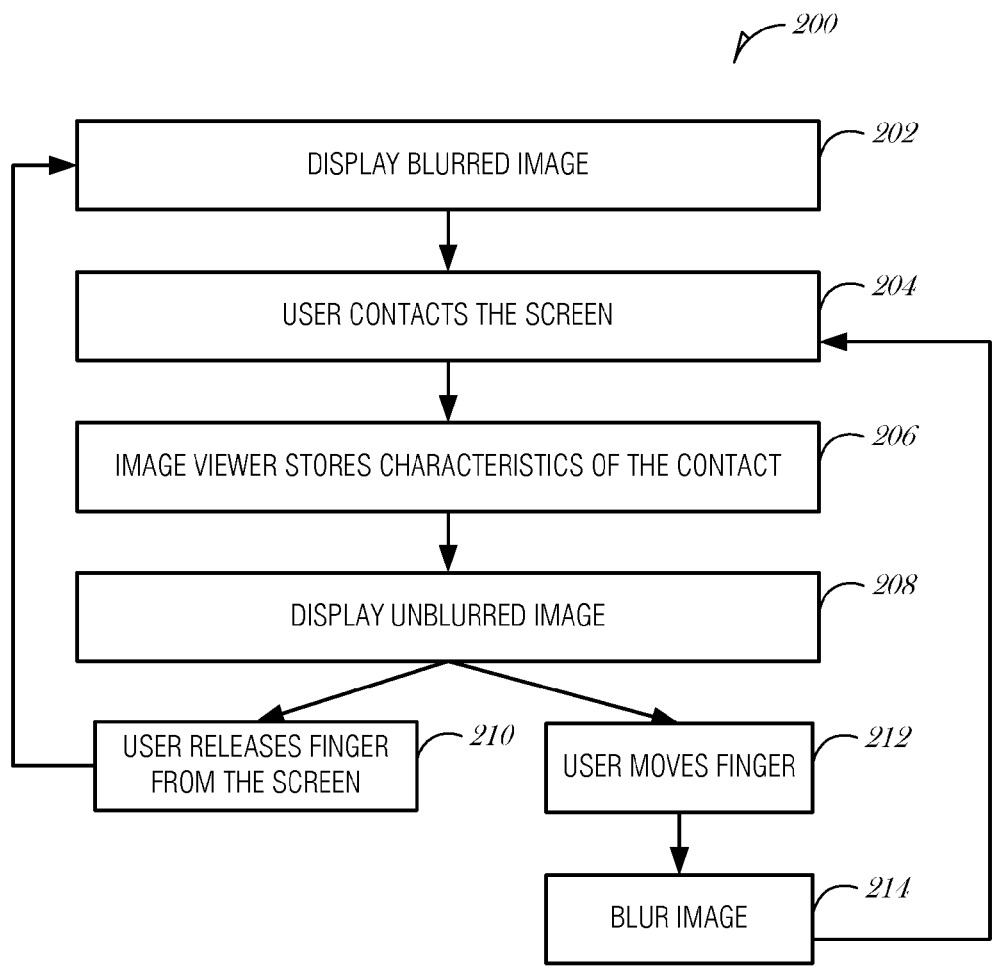
FIG. 2 is a diagram illustrating the control flow to control screen captures, according to an embodiment.

Some types of social networking applications may allow a user to post an image, video, or other content to a website for other users to view. Other types of social networking applications allow a user to directly transmit content to one or more other users. In either case, the user who generated the content may not want the content to disseminate further than those who were provided the content from the user. In another example, a user may desire to transmit or share content on a temporary basis, such as for a few minutes or seconds. Once the time period expires, the user may desire that the content is disabled, deleted, or otherwise unavailable. However, users that receive content may intentionally replicate the content in order to further disseminate it, modify it, or otherwise use it in a manner that could harm or embarrass the content owner.

One mechanism to dissuade or impede unauthorized sharing is to blur or obscure the content when it is displayed on the receiving user's device. For example, a software application may blur an image so that the contents are indecipherable. Upon some user action, such as touching a touchscreen for a threshold period of time, the software application may unblur (e.g., focus) some or all of the image for viewing. By only focusing a portion of the image, the software application impedes or dissuades screenshots or printing of the image. Further, the software application may disable software or hardware mechanisms to capture screenshots, print, or send content. In some cases though, a user may unblur an image and then capture a screenshot of the focused image. What is needed is an improved mechanism to protect the content.

FIGS. 1A-1C are schematic drawings illustrating a system 100 to control screen captures, according to an embodiment. The system 100 may be any type of electronic or computing device, including but not limited to a smartphone, cellular telephone, mobile phone, laptop computer, tablet computer, or other networked device.

In operation, a user may be presented an image 102 on a touchscreen 104 of the system 100. The image 102 may be initially presented in an out-of-focus (e.g., blurred) state (FIG. 1A). The blurred image may be made with a blur filter (e.g., a Gaussian blur filter) configured to substantially obscure the contents of the image 102. By blurring the image 102, the system 100 effectively renders useless any screenshots of the image 102. In the example shown, to take a screenshot, the user presses a power button 106 and a control button 108, simultaneously. The power button 106 may be used to power on or power off the system 100, put the system 100 into a sleep mode, wake the system 100 from sleep, or other similar functions. The control button 108 may be used to navigate the user to a home screen, display contextual menus, or perform other user interface functions on the system 100. It is understood that one or both of the power button 106 or the control button 108 may be hard controls or soft controls.

To unblur the image 102, the user presses their finger on the touchscreen 104 to create a contact point 110 (FIG. 1B). When the user maintains a substantially static contact point 110 for some time, after a threshold period of time (e.g., 1 second), the image 102 may be unblurred. The image 102 is then presented in an unblurred state until the user removes their finger or until the contact point 110 changes substantially. A change in the contact point 110 may be used to infer an intention of the user to screen capture the image 102. By blurring the image 102, an attempt to screen capture the image may be impeded.

In FIG. 1C, the contact point 110 is shown to have changed shape and area. Because the contact point 110 has changed by more than some threshold (e.g., size, shape, area, pressure, etc.), then the image 102 is blurred. If the new contact point 110 is maintained for a threshold period, then the image 102 may be unblurred again, returning to the state illustrated in FIG. 1B.

The blurred image and unblurred image may be stored in memory as separate images. Alternatively, the unblurred image may be stored in memory and a filter may be applied to blur the image. The filter may be any type of blur filter including but not limited to a Gaussian blur, linear blur, gradient blur, circle blur, radial blur, zoom blur, variable blur, prism blur, or the like.

FIGS. 1A-1C illustrate an "unblur" control 112, which may be used by the user to unblur the image 102 in a similar manner (e.g., by pressing and holding the touch). In some embodiments, the unblur control 112 is used exclusively to unblur the image 102. In other embodiments, the user may press anywhere on the touchscreen to focus the image 102.

FIG. 2 is a diagram illustrating the control flow 200 to control screen captures, according to an embodiment. At block 202, a blurred image is displayed. A user then taps the touchscreen and holds the contact point (block 204). At block 206, the image viewer application may store characteristics of the contact point (e.g., area, size, perimeter, dimensions, pressure, etc.). After a timeout period, which may be user configurable, an unblurred image is presented (block 208). If the user removes their finger from the screen (block 210), then the control flow 200 moves to block 202, where the image is displayed in a blurred state. If the user moves their finger (e.g., rolls it, rotates it, etc.) (block 212), then at block 214, the image is blurred. The image may be blurred for a short time, such as for two seconds. Alternatively, the image may be blurred until the user reestablishes a substantially static contact point. The control flow 200 may move to block 204, where the user's contact is registered and characteristics of the contact point are detected and stored (block 206). After the threshold period, an unblurred image may be presented again to the user (block 208). So long as the user does not release their finger from the touchscreen (block 210) or move their finger too much (block 212), the user is presented the unblurred image.

While FIG. 2 discusses finger movement as the trigger to re-blur the image (e.g., block 212), other mechanisms may be used in combination with the finger movement. For example, a camera on the device may be used to identify motion indicative of a user preparing to press the appropriate controls for a screenshot. As another example, an accelerometer or gyrometer may be used to detect movement of the device in conjunction with the finger movement, which may indicate that the user is preparing to press controls to take a screenshot.

Figure 3:
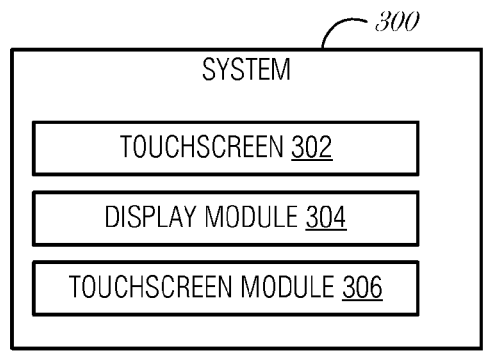
FIG. 3 is a block diagram illustrating a system for controlling screen captures, according to an embodiment.

FIG. 3 is a block diagram illustrating a system 300 for controlling screen captures, according to an embodiment. The system 300 comprises a touchscreen 302, a display module 304, and a touchscreen module 306. The display module 304 is generally used to display graphics on the touchscreen 302, while the touchscreen module 306 is generally used by the operating system to interface with the touchscreen 302, in order to capture touch gestures and other input sensed by the touchscreen 302 for use in the operating system or applications executing in the operating system. The display module 304 is configured to display on the touchscreen an image in a blurred state to a user. The touchscreen module 306 is communicatively coupled to the touchscreen 302, and configured to detect a contact point on the touchscreen 302 resulting from the user touching the touchscreen 302. The display module 304 displays the image in a focused state on the touchscreen 302 in response to the touchscreen module 306 detecting the contact point. This may be performed after a timeout period, such as two seconds, where the contact point is substantially static. The touchscreen module 306 is configured to detect a change in the contact point and the display module 304 is configured to display the image in the blurred state in response to the touchscreen module 306 detecting the change in the contact point.

In an embodiment, to display the image in the blurred state, the display module 304 is configured to apply a blur filter to the image.

In an embodiment, to detect the change in the contact point, the touchscreen module 306 is configured to identify a threshold change in area and monitor the area of the contact point to determine whether the area of the contact point changes exceeds the threshold change. The threshold change in area may be a value in a number of pixels or other measurement (e.g., square centimeters). The threshold change in area may also be expressed as a percentage (e.g., plus or minus 5% change in area).

In an embodiment, to detect the change in the contact point, the touchscreen module 306 is configured to identify a threshold change in rotation and monitor the contact point to determine whether the orientation of the contact point changes exceeds the threshold change. The threshold change in rotation may be expressed as a number of radians, angle in degrees, or a percentage change.

In an embodiment, to detect the change in the contact point, the touchscreen module 306 is configured to identify a threshold change in shape and monitor the contact point to determine whether the shape of the contact point changes exceeds the threshold change.

In an embodiment, to detect the change in the contact point, the touchscreen module is configured to identify a threshold change in perimeter and monitor the contact point to determine whether the perimeter of the contact point changes exceeds the threshold change. The perimeter may be expressed as a length in a standard measurement (e.g., centimeters) or as a pixel measurement.

In an embodiment, to detect the change in the contact point, the touchscreen module is configured to use a heuristic rule to determine whether the contact point changes in a manner to indicate that the user is attempting to capture a screenshot of the image. The heuristic rule may be formed over time after observing the usage behavior of one or more users. For example, a certain shift in device position with a certain shift in finger position may occur before a screenshot operation. Recognizing the shift in device position of the shift in finger position may be used in a heuristic rule to determine when a user may be trying to take a screenshot.

In a further embodiment, the system 300 includes a sensor module to access a sensor value of a sensor in the system and display the image in the blurred state in response to detecting the change in the contact point and the sensor value. In an embodiment, the sensor comprises a gyrometer, and the sensor value of the gyrometer indicates motion.

Figure 4:
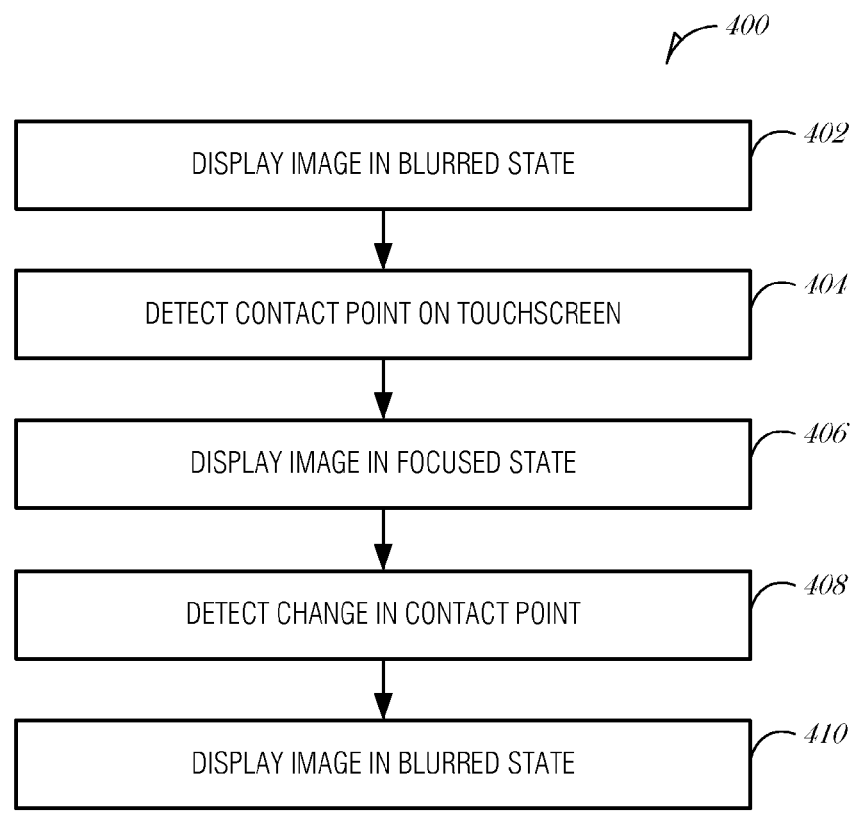
FIG. 4 is a flowchart illustrating a method for controlling screen captures, according to an embodiment.

FIG. 4 is a flowchart illustrating a method 400 for controlling screen captures, according to an embodiment. At block 402, an image in a blurred state is displayed on a touchscreen of a mobile device to a user.

At block 404, a contact point on the touchscreen resulting from the user touching the touchscreen is detected.

At block 406, the image is displayed in a focused state on the touchscreen in response to detecting the contact point.

At block 408, a change in the contact point is detected. In an embodiment, displaying the image in the blurred state comprises applying a blur filter to the image.

In an embodiment, detecting the change in the contact point comprises identifying a threshold change in area and monitoring the area of the contact point to determine whether the area of the contact point changes exceeds the threshold change.

In an embodiment, detecting the change in the contact point comprises identifying a threshold change in rotation and monitoring the contact point to determine whether the orientation of the contact point changes exceeds the threshold change.

In an embodiment, detecting the change in the contact point comprises identifying a threshold change in shape and monitoring the contact point to determine whether the shape of the contact point changes exceeds the threshold change.

In an embodiment, detecting the change in the contact point comprises identifying a threshold change in perimeter and monitoring the contact point to determine whether the perimeter of the contact point changes exceeds the threshold change.

In an embodiment, detecting the change in the contact point comprises using a heuristic rule to determine whether the contact point changes in a manner to indicate that the user is attempting to capture a screenshot of the image.

At block 410, the image is displayed in the blurred state in response to determining the change in the contact point.

In a further embodiment, the method 400 includes accessing a sensor value in the mobile device and displaying the image in the blurred state in response to detecting the change in the contact point and the sensor value. In an embodiment, the sensor comprises a gyrometer, and displaying the image in the blurred state in response to detecting the change in the contact point and the sensor value comprises displaying the image in the blurred state when the sensor value of the gyrometer indicates motion.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 5:
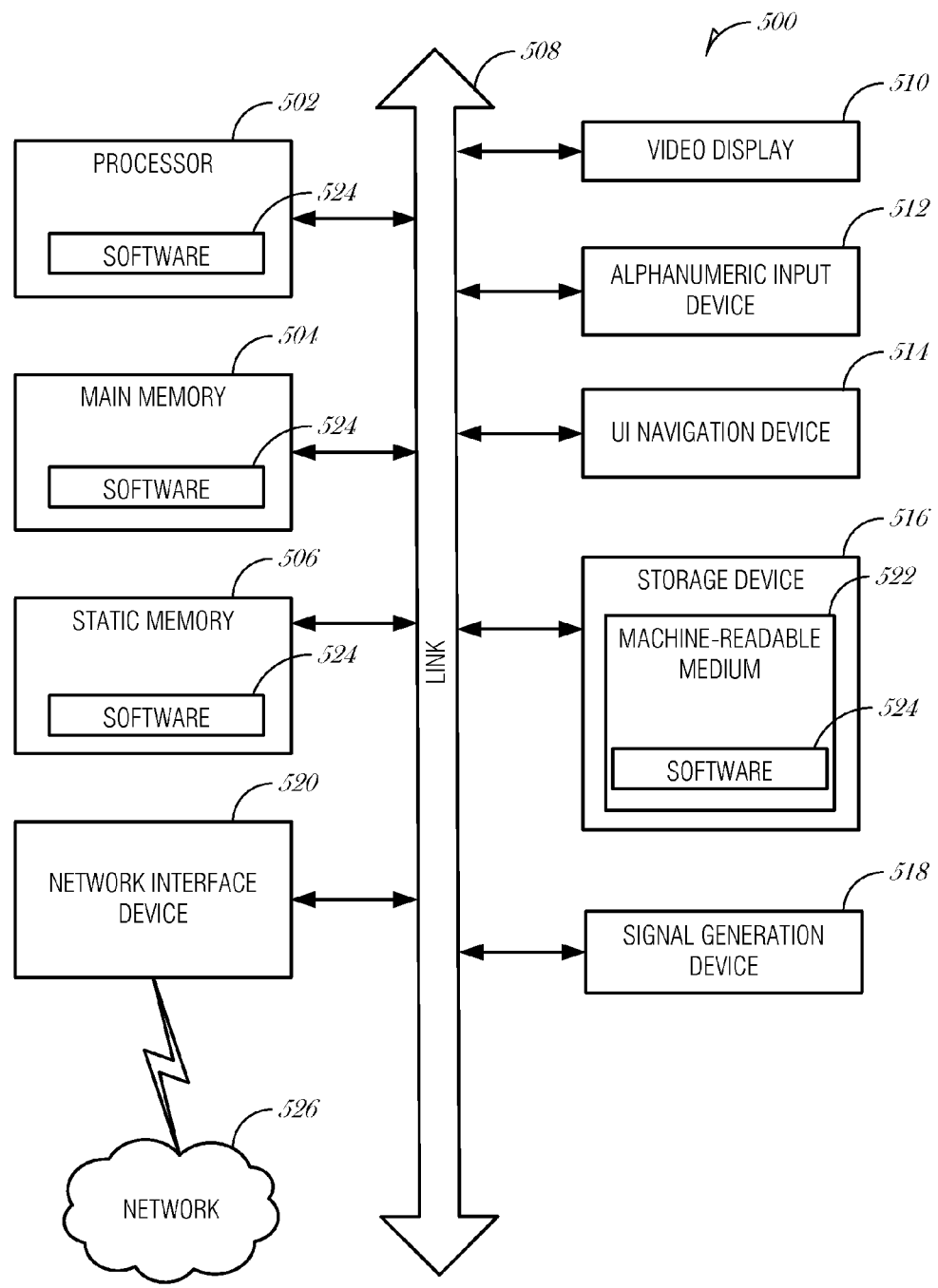
FIG. 5 is a block diagram illustrating an example machine upon which any one or more of the techniques (e.g., methodologies) discussed herein may perform, according to an example embodiment.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 includes subject matter for controlling screen captures (such as a device, apparatus, or machine) comprising a system comprising a touchscreen; a display module communicatively coupled to the touchscreen, the display module to display on the touchscreen an image in a blurred state to a user; a touchscreen module communicatively coupled to the touchscreen, the touchscreen module to detect a contact point on the touchscreen resulting from the user touching the touchscreen; wherein the display module is to display the image in a focused state on the touchscreen in response to the touchscreen module detecting the contact point; wherein the touchscreen module is to detect a change in the contact point; and wherein the display module is to display the image in the blurred state in response to the touchscreen module detecting the change in the contact point.

In Example 2, the subject matter of Example 1 may include, wherein to display the image in the blurred state, the display module is configured to apply a blur filter to the image.

In Example 3, the subject matter of any one or more of Examples 1 to 2 may include, wherein to detect the change in the contact point, the touchscreen module is to: identify a threshold change in area; and monitor the area of the contact point to determine whether the area of the contact point changes exceeds the threshold change.

In Example 4, the subject matter of any one or more of Examples 1 to 3 may include, wherein to detect the change in the contact point, the touchscreen module is to: identify a threshold change in rotation; and monitor the contact point to determine whether the orientation of the contact point changes exceeds the threshold change.

In Example 5, the subject matter of any one or more of Examples 1 to 4 may include, wherein to detect the change in the contact point, the touchscreen module is to: identify a threshold change in shape; and monitor the contact point to determine whether the shape of the contact point changes exceeds the threshold change.

In Example 6, the subject matter of any one or more of Examples 1 to 5 may include, wherein to detect the change in the contact point, the touchscreen module is to: identify a threshold change in perimeter; and monitor the contact point to determine whether the perimeter of the contact point changes exceeds the threshold change.

In Example 7, the subject matter of any one or more of Examples 1 to 6 may include, wherein to detect the change in the contact point, the touchscreen module is to use a heuristic rule to determine whether the contact point changes in a manner to indicate that the user is attempting to capture a screenshot of the image.

In Example 8, the subject matter of any one or more of Examples 1 to 7 may include, wherein the heuristic rule is formed over time based on the usage behavior of the user.

In Example 9, the subject matter of any one or more of Examples 1 to 8 may include, wherein the usage behavior of the user includes a shift in finger position before a screenshot operation occurs.

In Example 10, the subject matter of any one or more of Examples 1 to 9 may include, a sensor module to: access a sensor value of a sensor in the system; and display the image in the blurred state in response to detecting the change in the contact point and the sensor value.

In Example 11, the subject matter of any one or more of Examples 1 to 10 may include, wherein the sensor comprises a gyrometer, and wherein the sensor value of the gyrometer indicates motion.

Example 12 includes subject matter for controlling screen captures (such as a method, means for performing acts, machine readable medium including instructions that when performed by a machine cause the machine to performs acts, or an apparatus configured to perform) comprising: displaying on a touchscreen of a mobile device, an image in a blurred state to a user; detecting a contact point on the touchscreen resulting from the user touching the touchscreen; displaying the image in a focused state on the touchscreen in response to detecting the contact point; detecting a change in the contact point; and displaying the image in the blurred state in response to detecting the change in the contact point.

In Example 13, the subject matter of Example 12 may include, wherein displaying the image in the blurred state comprises applying a blur filter to the image.

In Example 14, the subject matter of any one or more of Examples 12 to 13 may include, wherein detecting the change in the contact point comprises: identifying a threshold change in area; and monitoring the area of the contact point to determine whether the area of the contact point changes exceeds the threshold change.

In Example 15, the subject matter of any one or more of Examples 12 to 14 may include, wherein detecting the change in the contact point comprises: identifying a threshold change in rotation; and monitoring the contact point to determine whether the orientation of the contact point changes exceeds the threshold change.

In Example 16, the subject matter of any one or more of Examples 12 to 15 may include, wherein detecting the change in the contact point comprises: identifying a threshold change in shape; and monitoring the contact point to determine whether the shape of the contact point changes exceeds the threshold change.

In Example 17, the subject matter of any one or more of Examples 12 to 16 may include, wherein detecting the change in the contact point comprises: identifying a threshold change in perimeter; and monitoring the contact point to determine whether the perimeter of the contact point changes exceeds the threshold change.

In Example 18, the subject matter of any one or more of Examples 12 to 17 may include, wherein detecting the change in the contact point comprises using a heuristic rule to determine whether the contact point changes in a manner to indicate that the user is attempting to capture a screenshot of the image.

In Example 19, the subject matter of any one or more of Examples 12 to 18 may include, wherein the heuristic rule is formed over time based on the usage behavior of the user.

In Example 20, the subject matter of any one or more of Examples 12 to 19 may include, wherein the usage behavior of the user includes a shift in finger position before a screenshot operation occurs.

In Example 21, the subject matter of any one or more of Examples 12 to 20 may include, accessing a sensor value in the mobile device; and displaying the image in the blurred state in response to detecting the change in the contact point and the sensor value.

In Example 22, the subject matter of any one or more of Examples 12 to 21 may include, wherein the sensor comprises a gyrometer, and wherein displaying the image in the blurred state in response to detecting the change in the contact point and the sensor value comprises displaying the image in the blurred state when the sensor value of the gyrometer indicates motion.

Example 23 includes a machine-readable medium including instructions, which when executed by a machine, cause the machine to perform operations of any of the Examples 12-22.

Example 24 includes an apparatus comprising means for performing any of the Examples 12-22.

Example 25 includes an apparatus comprising: means for displaying on a touchscreen of a mobile device, an image in a blurred state to a user; means for detecting a contact point on the touchscreen resulting from the user touching the touchscreen; means for displaying the image in a focused state on the touchscreen in response to detecting the contact point; means for detecting a change in the contact point; and means for displaying the image in the blurred state in response to detecting the change in the contact point.

In Example 26, the subject matter of Example 25 may include, wherein the means for displaying the image in the blurred state comprises means for applying a blur filter to the image.

In Example 27, the subject matter of any one or more of Examples 25 to 26 may include, wherein the means for detecting the change in the contact point comprises: means for identifying a threshold change in area; and means for monitoring the area of the contact point to determine whether the area of the contact point changes exceeds the threshold change.

In Example 28, the subject matter of any one or more of Examples 25 to 27 may include, wherein the means for detecting the change in the contact point comprises: means for identifying a threshold change in rotation; and means for monitoring the contact point to determine whether the orientation of the contact point changes exceeds the threshold change.

In Example 29, the subject matter of any one or more of Examples 25 to 28 may include, wherein the means for detecting the change in the contact point comprises: means for identifying a threshold change in shape; and means for monitoring the contact point to determine whether the shape of the contact point changes exceeds the threshold change.

In Example 30, the subject matter of any one or more of Examples 25 to 29 may include, wherein the means for detecting the change in the contact point comprises: means for identifying a threshold change in perimeter; and means for monitoring the contact point to determine whether the perimeter of the contact point changes exceeds the threshold change.

In Example 31, the subject matter of any one or more of Examples 25 to 30 may include, wherein the means for detecting the change in the contact point comprises means for using a heuristic rule to determine whether the contact point changes in a manner to indicate that the user is attempting to capture a screenshot of the image.

In Example 32, the subject matter of any one or more of Examples 25 to 31 may include, wherein the heuristic rule is formed over time based on the usage behavior of the user.

In Example 33, the subject matter of any one or more of Examples 25 to 32 may include, wherein the usage behavior of the user includes a shift in finger position before a screenshot operation occurs.

In Example 34, the subject matter of any one or more of Examples 25 to 33 may include, further comprising: means for accessing a sensor value in the mobile device; and means for displaying the image in the blurred state in response to detecting the change in the contact point and the sensor value.

In Example 35, the subject matter of any one or more of Examples 25 to 34 may include, wherein the sensor comprises a gyrometer, and wherein the means for displaying the image in the blurred state in response to detecting the change in the contact point and the sensor value comprises means for displaying the image in the blurred state when the sensor value of the gyrometer indicates motion.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third,"

etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for controlling screen captures, the system comprising:
    a touchscreen;
    a display module communicatively coupled to the touchscreen, the display module to display on the touchscreen an image in a blurred state to a user;
    a touchscreen module communicatively coupled to the touchscreen, the touchscreen module to detect a contact point on the touchscreen resulting from the user touching the touchscreen;
    wherein the display module is to display the image in a focused state on the touchscreen in response to the touchscreen module detecting the contact point;
    wherein the touchscreen module is to detect a change in the contact point; and
    wherein the display module is to display the image in the blurred state in response to the touchscreen module detecting the change in the contact point,
    wherein to detect the change in the contact point, the touchscreen module is to use a heuristic rule to determine whether the contact point changes in a manner to indicate that the user is attempting to capture a screenshot of the image.

2. The system of claim 1, wherein to display the image in the blurred state, the display module is configured to apply a blur filter to the image.

3. The system of claim 1, wherein to detect the change in the contact point, the touchscreen module is to:
    identify a threshold change in area; and
    monitor the area of the contact point to determine whether the area of the contact point changes exceeds the threshold change.

4. The system of claim 1, wherein to detect the change in the contact point, the touchscreen module is to:
    identify a threshold change in rotation; and
    monitor the contact point to determine whether the orientation of the contact point changes exceeds the threshold change.

5. The system of claim 1, wherein to detect the change in the contact point, the touchscreen module is to:
    identify a threshold change in shape; and
    monitor the contact point to determine whether the shape of the contact point changes exceeds the threshold change.

6. The system of claim 1, wherein to detect the change in the contact point, the touchscreen module is to:
    identify a threshold change in perimeter; and
    monitor the contact point to determine whether the perimeter of the contact point changes exceeds the threshold change.

7. The system of claim 1, wherein the heuristic rule is formed over time based on the usage behavior of the user.

8. The system of claim 7, wherein the usage behavior of the user includes a shift in finger position before a screenshot operation occurs.

9. The system of claim 1, further comprising a sensor module to:
    access a sensor value of a sensor in the system; and
    display the image in the blurred state in response to detecting the change in the contact point and the sensor value.

10. The system of claim 9, wherein the sensor comprises a gyrometer, and wherein the sensor value of the gyrometer indicates motion.

11. A method of controlling screen captures, the method comprising:
    displaying on a touchscreen of a mobile device, an image in a blurred state to a user;
    detecting a contact point on the touchscreen resulting from the user touching the touchscreen;
    displaying the image in a focused state on the touchscreen in response to detecting the contact point;
    detecting a change in the contact point; and
    displaying the image in the blurred state in response to detecting the change in the contact point,
    wherein detecting the change in the contact point comprises using a heuristic rule to determine whether the contact point changes in a manner to indicate that the user is attempting capture a screenshot of the image.

12. The method of claim 11, wherein displaying the image in the blurred state comprises applying a blur filter to the image.

13. The method of claim 11, wherein detecting the change in the contact point comprises:
    identifying a threshold change in area; and
    monitoring the area of the contact point to determine whether the area of the contact point changes exceeds the threshold change.

14. The method of claim 11, wherein detecting the change in the contact point comprises:
    identifying a threshold change in rotation; and
    monitoring the contact point to determine whether the orientation of the contact point changes exceeds the threshold change.

15. The method of claim 11, wherein detecting the change in the contact point comprises:
    identifying a threshold change in shape; and
    monitoring the contact point to determine whether the shape of the contact point changes exceeds the threshold change.

16. The method of claim 11, wherein detecting the change in the contact point comprises:
    identifying a threshold change in perimeter; and
    monitoring the contact point to determine whether the perimeter of the contact point changes exceeds the threshold change.

17. The method of claim 11, wherein the heuristic rule is formed over time based on the usage behavior of the user.

18. The method of claim 17, wherein the usage behavior of the user includes a shift in finger position before a screenshot operation occurs.

19. The method of claim 11, further comprising:
accessing a sensor value in the mobile device; and
displaying the image in the blurred state in response to detecting the change in the contact point and the sensor value.

20. A non-transitory machine-readable medium including instructions for controlling screen captures, which when executed by a machine, cause the machine to:
display on a touchscreen of a mobile device, an image in a blurred state to a user;
detect a contact point on the touchscreen resulting from the user touching the touchscreen;
display the image in a focused state on the touchscreen in response to detecting the contact point;
detect a change in the contact point; and
display the image in the blurred state in response to detecting the change in the contact point,
wherein the instructions to detect the change in the contact point comprise instructions to use a heuristic rule to determine whether the contact point changes in a manner to indicate that the user is attempting to capture a screenshot of the image.

21. The non-transitory machine-readable medium of claim 20, wherein the heuristic rule is formed over time based on the usage behavior of the user.

22. The non-transitory machine-readable medium of claim 21, wherein the usage behavior of the user includes a shift in finger position before a screenshot operation occurs.

* * * * *